3,248,220
TWO-COMPONENT DIAZOTYPE MATERIAL
Wilhelmus Josephus van Rhijn, Venlo, Netherlands, assignor to Chemische Fabriek L. van der Grinten N.V., Venlo, Netherlands, a corporation of the Netherlands
No Drawing. Filed Nov. 20, 1962, Ser. No. 239,055
Claims priority, application Netherlands, Nov. 22, 1961, 271,675
9 Claims. (Cl. 96—91)

The invention relates to diazotype material, and more particularly to so-called two-component diazotype material which includes in the radiation-sensitive layer both a light-sensitive diazo compound and a coupling component adapted to react therewith to form an azo dye. The invention is especially concerned with such material, in which are present a light-sensitive benzene diazo compound having a tertiary amino group in para-position with respect to the diazo group an azo coupling component selected from 2,3-dihydroxy naphthalene and 2,3-dihydroxynaphthalene 6-sulphonic acid and its water-soluble salts, and a water-soluble stable zinc salt.

A fairly light-sensitive benzene diazo compound with a tertiary amino group in para-position is, for instance, 4-diazo-N,N-diethylaniline; 4-diazo-2,5-diethoxy-phenyl-morpholine is even more light-sensitive. Both compounds, also in combination with azo coupling components of the 2,3-dihydroxynaphthalene type, are used on a large scale in two-component diazotype material which can be developed with ammonia vapour.

Such benzene diazo compounds yield more or less blue azo-dyestuffs with these azo coupling components. However, in most cases the azo-dyestuffs do not have a pure blue colour but, owing to the presence of an additional red shade, are more or less violet-blue.

The diazotype materials containing such a combination of diazo compound and azo coupling component may be blue-developing or black-developing diazotype materials. The black-developing diazotype materials contain, besides one or more diazo compounds and azo coupling components as referred to above, one or more orange-, yellow, or yellow-brown-coupling azo components (such as acetacetic anilide or resorcinol).

The additional red shade in the copies manufactured on these two kinds of diazotype material is inconvenient, especially in the image portions which are under-exposed, the so-called background, which often appears in copies made from originals with a weak contrast, such as pencil drawings, typed letters and the like. In one case the azo-dyestuff shows an undesirable violet-blue shade, in the other case the azo-dyestuff shade is a reddish black instead of a neutral black.

Such two-component diazotype material usually contains a quantity of a reasonable water-soluble zinc salt, which does not decompose under normal atmospheric conditions, such as zinc chloride or zinc sulphate. The zinc salt enhances the keeping qualities and the developing speed of the diazotype material, as well as the brilliancy of the colour of the azo-dyestuff in the copies manufactured with this diazotype material.

Dutch patent specification No. 60,285 describes black-developing two-component diazotype paper, which contains, besides the diazo compound, a molecular compound of the azo coupling component phloroglucinol with a tertiary amine, such as caffeine, antipyrine, and quinoline. Owing to the presence of the tertiary amine the shade of the azo-dyestuff becomes a bluish black instead of a reddish black. Such tertiary amines do not substantially change the shade of azo-dyestuffs from p-tertiary aminobenzene diazo compounds and azo coupling components of the 2,3-dihydroxynaphthalene type.

It has now been found that upon application of the last-mentioned combinations of diazo compounds and azo coupling components the inconvenient additional red shade substantially or entirely disappears if the light-sensitive layer is given a content of an essentially colourless non-coupling benzimidazole of which at least 0.5% by weight, in the form of the hydrochloride, dissolves in water and which is of the general formula:

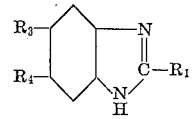

or

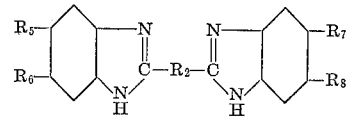

in which $R_1$ represents a hydrogen atom, an alkyl group, an aralkyl group (which may be substituted in the alkyl radical by a hydroxyl group), an alkyl group containing one or more OH-groups, an aminoalkyl group, a cyanoalkyl group, an alkyl carbonyl group, an alkoxy carbonyl group or a substituted or non-substituted amidocarbonyl group, $R_2$ represents a hydroxyalkylene radical, and $R_3$, $R_4$, $R_5$, $R_6$, $R_7$, and $R_8$ represents hydrogen atoms or substituents selected from halogen atoms, alkyl radicals, alkoxy radicals and nitro groups.

Because the colour of the azo-dyestuffs formed from benzene diazo compounds with a tertiary amino group in para-position and azo coupling components of the 2,3-dihydroxynaphthalene type is strongly changed from violet-blue to pure blue by the water-soluble benzimidazoles of the said general formulae in the presence of zinc ions, the diazotype material according to the invention yields copies with more purely blue or more neutrally black azo-dyestuff images than similar diazotype material which does not contain one of said benzimidazoles.

It is true that, dependent on the composition of the diazotype material the colour may still show a slight additional reddish shade immediately after the development in ammonia vapour, but after a few hours the definite pure blue or neutral black colour will have been formed.

The benzimidazoles are added, sometimes preferably in the form of their hydrochloride, to the aqueous sensitizing liquids commonly used in the manufacture of two-component diazotype material, preferably in a quantity of 0.5–3% by weight. However, they can also be added, with equally good results, to an aqueous pre-coating liquid, also in a quantity of preferably 0.5–3% by weight.

Quantities of less than 0.5% by weight are generally too small to afford a useful effect. Quantities larger than 3% by weight are not attractive for economic reasons. The benzimidazoles may be applied separately or in admixture with each other. In the latter case quantities of less than 0.5% by weight of the separate compounds may be used, provided the total quantity is larger than 0.5% by weight.

Benzimidazoles according to the above formulae, which are suitable for application in the diazotype material according to the invention, are mentioned in the following table, in which the melting point of each compound is also mentioned, as well as its preparation or origin.

| Compound | Melting point in ° C. | Preparation/origin |
|---|---|---|
| Benzimidazole | 170 | From o-phenylenediamine and formic acid.[1] |
| Benzimidazole- | | |
| 2-methyl | 177–178 | Product of commerce. |
| 2-ethyl | 175–176 | Do. |
| 2-propyl | 153–155 | From o-phenylenediamine and butyric acid.[1] |
| 2-hydroxymethyl | 170–172 | From o-phenylenediamine and glycolic acid.[1] |
| 2-(1'-hydroxyethyl) | 179–180 | From o-phenylenediamine and lactic acid.[1] |
| 2-(2'-hydroxyethyl) | 154–155 | From o-phenylenediamine and hydroxypropionitrile.[1] |
| 2-(1'-hydroxypropyl) | 222–224 | From o-phenylenediamine and α-hydroxybutyric acid (prepared by hydrolysis of α-bromobutyric acid).[1] |
| 2-(2'-hydroxypropyl) | 196–197 | From o-phenylenediamine and β-hydroxybutyric acid.[1] |
| 2-(3'-hydroxypropyl) | 165–167 | Product of commerce. |
| 2-(1',2'-dihydroxyethyl) | 157–160 | From o-phenylenediamine and glyceric acid.[1] |
| 2-(1'-hydroxy-n-pentyl) | 192–193 | From o-phenylenediamine and α-hydroxycaproic acid.[1] |
| 2-aminomethyl | 263 | By hydrolysis of the reaction product of o-phenylenediamine and hippuric acid.[1] |
| 2-cyano methyl | 95–98 | From o-phenylenediamine and cyanoacetic acid ethylester.[2] |
| 2-benzyl | 164–167 | Product of commerce. |
| 2-(hydroxy)(phenyl)-methyl | 211–213 | Do. |
| 2-acetyl | 178–181 | By oxidation with chromic acid of the reaction product from o-phenylenediamine and lactic acid. |
| 2-ethoxy-carbonyl | 221–222 | By oxidation of 2-hydroxymethyl benzimidazole, treatment of the oxidation product with thionyl chloride and of the product thus obtained with ethanol. |
| 6-nitro | 199–201 | From 1-amino-2-amino-4-nitrobenzene and formic acid.[1] |
| 2-methyl-5,6-dimethoxy | 174–176 | From 4,5-dimethoxy-o-phenylenediamine and acetic acid.[1] |
| 2-methyl 5-chloro | 168–170 | Product of commerce. |
| 2-hydroxymethyl 5,6-dimethyl | 232–233 | Do. |
| 2-(1'-hydroxyethyl)5,6-dimethyl | 221–222 | Do. |
| 2-[(1'-hydroxy)(1'-methyl)ethyl]5,6-dimethyl | 210–212 | Do. |
| 2-(hydroxy 1'-benzimidazolyl (2")-2')ethyl benzimidazole sulphate. | 280 | See J. Org. Chem. 26, 462 (1961). |
| 2-(dihydroxy-1',2'-benzimidazolyl (2")-2') ethyl benzimidazole. | 300 | Do. |
| 2-(hydroxy 1'-benzimidazolyl (2")-3')propyl benzimidazole. | 268–269 | Do. |

[1] J. Chem. Soc. 1928, 2395.
[2] Archiv der Pharmazie, Vol. 293 No. 8, 762 (1960).

The benzimidazoles of the general formula:

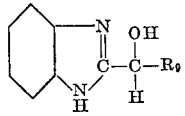

in which $R_9$ is a hydrogen atom or an alkyl radical, have a very great colour changing effect. These compounds, and especially those in which $R_9$ is an alkyl radical with fewer than 7 carbon atoms, are very soluble in the commonly used acid aqueous sensitizing liquids and may be prepared very easily.

The diazotype material according to the invention contains as diazo compound preferably a 4-diazo N,N-dialkylaniline, such as 4-diazo N,N-dimethylaniline, 4-diazo N,N-diethylaniline, 4-diazo-N-β-hydroxyethyl N-ethylaniline, and 4-diazo N,N-di-n-propylaniline, or a 4-diazo 2,5-dialkoxyphenylmorpholine, such as 4-diazo 2,5-dimethoxyphenylmorpholine, and 4-diazo 2,5-diethoxyphenylmorpholine.

Besides one or more azo coupling components of the 2,3-dihydroxynaphthalene type it may contain some other blue-coupling azo components, such as 2-hydroxy 3-β-hydroxyethylamidocarbonyl naphthalene or 2,7-dihydroxynaphthalene 3,6-disulphonic acid.

Suitable yellow-, orange-, or yellow-brown-coupling azo components, which may serve for the manufacture of diazotype materials yielding black azo-dyestuffs upon development, are, for instance, non-volatile acetoacetic amides, such as 3-hydroxy-acetoacetic anilide, N-(3- hydroxyphenyl)-urea, reaction products of phenols, such as 2,5-dimethylphenol, with formaldehyde, and amides such as morpholine, resorcinol derivatives with large molecules, such as 2,4,2',4'-tetra-hydroxydiphenyl.

Besides paper, other supports commonly used in the manufacture of diazotype materials, such as linen, paper on linen, transparent paper or film may be used.

United States patent specification 2,548,845 describes the application in the diazotype process of benzimidazoles, the benzene nucleus of which carries a hydroxyl group. These compounds couple fairly actively with benzene diazo compounds with a tertiary amino group in para-position while forming azo-dyestuffs which are lighter in colour than the azo-dyestuffs formed by the azo coupling components of the 2,3-dihydroxynaphthalene type. Consequently, they are not suitbale for application in the diazotype material according to the invention.

The light-sensitive layer of the diazotype material according to the invention may contain the usual auxiliary agents, such as acids, for instance tartaric acid, citric acid, boric acid; metal salts, such as aluminium sulphate, alum, zinc chloride, magnesium chloride, nickel sulphate; substances which serve to enhance the developing speed, such as glycerol, polyethyleneglycol, urea, allyl thiourea; stabilizers, such as thiourea, naphthalene 1,3,6-trisulphonic acid or one of its salts; substances which serve to improve the quality of the surfaces of the diazotype materials, such as finely divided particles of silicon dioxide, aluminum oxide, barium sulphate or rice starch; binding agents, which serve to make the said particles adhere to the surface of the diazotype materials, such as ethers of cellulose or starch, polyvinyl alcohol, and synthetic resin dispersions, such as polyvinyl acetate dispersions; and substances which serve to improve the white background of the copies, such as urea. The following examples will serve to illustrate the invention:

*Example I*

White base-paper of, for instance, 80 g./m.² weight, suitable for the diazotype process, is sensitized with a sensitizing liquid of the following compositions 17 g. of 4-mortholino 2,5-diethoxybenzene diazonium chloride, zinc chloride double salt
38 g. of tartaric acid 30 g. of 2,3-dihydroxynaphthalene 6-sulphonic acid sodium salt
50 g. of N,N'-dimethylurea
40 g. of zinc chloride
10 ml. of hydrochloric acid
30 ml. of Vinnapas H. 60 (polyvinyl acetate emulsion)
10 g. of 2-hydroxymethyl benzimidazole
1000 ml. of water and dried.

The two-component diazotype material thus obtained is very light-sensitive.

The light-sensitive side of a sheet of this diazotype material is covered with a pencil tracing, the lines of which have only small density for ultraviolet radiation, and is then exposed through the drawing until the diazo compound underneath the blank portions of the drawing has been largely bleached out. The image is then developed in ammonia vapour. The copy obtained shows a fine blue image on a foggy blue background.

If the 2-hydroxymethyl benzimidazole is omitted from the above-mentioned liquid, the foggy background has an unattractive violet-blue shade. Instead of 2-hydroxymethyl benzimidazole an equal quantity of 2-methyl-5-chloro benzimidazole may be used with the same result.

*Example II*

White base-paper of weight 80 g./m.$^2$, suitable for the diazotype process, is sensitized with a liquid of the following composition:

13.5 g. of 4-diethylaminobenzene diazonium chloride, zinc chloride double salt
11.5 g. of tartaric acid
35 g. of N,N'-dimethylurea
40 g. of 2,3-dihydroxynaphthalene 6-sulphonic acid sodium salt
30 g. of citric acid
30 g. of zinc chloride
20 g. of thiourea
30 ml. of Vinnapas H. 60
20 g. of benzimidazole
1000 ml. of water and dried.

A sheet of the diazotype material thus prepared is exposed and developed as in Example I. The copy obtained shows a bright blue image on a very bright blue foggy background.

A diazotype material manufactured with the aid of an identical sensitizing liquid, but without benzimidazole, yields copies with a violet-blue background under the same conditions.

With equally good or even better results 10 g. of 2-(1'-hydroxy-n-pentyl) benzimidazole or 2-n-propyl benzimidazole may be used instead of 20 g. of benzimidazole.

*Example III*

White base-paper of weight 80 g./m.$^2$, suitable for the diazotype process, is pre-coated with a liquid containing:

200 ml. of silica dispersion, Satessa 14
10 g. of 6-nitro benzimidazole
2 g. of polyvinyl alcohol
800 ml. of water dried, and then sensitized with the following liquid:

10.8 g. of 4-diethylaminobenzene diazonium chloride, zinc chloride double salt
29.2 g. of tartaric acid
30 g. of 2,3-dihydroxynaphthalene 6-sulphonic acid sodium salt
10 g. of N-β-hydroxyethyl N'-allyl thiourea
40 g. of zinc chloride
25 ml. of polyethylene glycol "400"
30 ml. of Vinnapas H. 60
In 1000 ml. of water and dried again.

The copies obtained with this diazotype material, by image-wise exposure and development as in Example I, show a very strong blue image on a bright blue foggy background. If the pre-coating liquid does not contain the 6-nitro benzimidazole, the background of the copies obtained is violet-blue.

*Example IV*

White base-paper of weight 80 g./m.$^2$, suitable for the diazotype process, is sensitized with a sensitizing liquid of the following composition:

17 g. of 4-morpholino 2,5-diethoxybenzene diazonium chloride, zinc chloride double salt
28 g. of tartaric acid
8 g. of 2,3-dihydroxynaphthalene
3 g. of 3-hydroxyacetoacetic anilide
10 ml. of hydrochloric acid (S.G. 1.19)
25 g. of caffeine
10 g. of N-β-hydroxyethyl N'-allyl thiourea
30 g. of zinc chloride
30 ml. of Vinnapas H. 60
20 g. of 2-(1',2'-dihydroxyethyl) benzimidazole
1000 ml. of water and dried.

A sheet of this diazotype material and of a similar diazotype material without 2-(1',2'-dihydroxyethyl) benzimidazole are imagewise exposed under the same original as in Example I and developed in ammonia vapour. The copy on the first sheet shows a black image on a neutral black background, while the image and the background of the second copy have a violet-black shade.

*Example V*

White base-paper of weight 80 g./m.$^2$, suitable for the diazotype process, is sensitized with a liquid containing:

15 g. of 4-diethylaminobenzene diazonium chloride, zinc chloride double salt
30 g. of tartaric acid
10 g. of 2,3-dihydroxynaphthalene
20 g. of caffeine
40 g. of zinc sulphate
10 ml. of hydrochloric acid
10 g. of 2-(dihydroxy-1',2'-benzimidazolyl(2'')2')-ethyl benzimidazole
30 ml. of Vinnapas H. 60
1000 ml. of water and dried.

A sheet of the diazotype material obtained is imagewise exposed as in Example I and then developed in ammonia vapour. The copy obtained shows a blue image on a foggy pure blue background.

If the benzimidazole is omitted from the above-mentioned solution, a copy with a foggy violet-blue background is obtained.

*Example VI*

White base-paper of weight 80 g./m.$^2$, suitale for the diazotype process, is sensitized with a liquid containing:

10 g. of 4-(N-ethyl N-β-hydroxyethyl)aminobenzene diazonium chloride, zinc chloride double salt
30 g. of citric acid
30 g. of 2,3-dihydroxynaphthalene 6-sulphonic acid sodium salt
10 g. of N-β-hydroxyethyl N'-allyl thiourea
30 g. of zinc chloride
30 ml. of Vinnapas H. 60
1000 ml. of water and dried.

A sheet of the diazotype material obtained is imagewise exposed and developed as in Example I. The copy shows a blue image on a blue background.

A sheet of diazotype material is manufactured in a similar way with an identical sensitizing liquid, to which 10 g. of 2-ethoxycarbonyl benzimidazole has been added, and with this material a copy is made in the same way. When the two copies are compared, the latter has a background of a considerably purer blue.

What I claim is:

1. Two-component diazotype material, in which are present a light-sensitive benzene diazonium compound having a tertiary amino group in para-position with respect to the diazo group, an azo coupling component selected from the class consisting of 2,3-dihydroxynaphthalene and 2,3-dihydroxynaphthalene 6-sulphonic acid and water-soluble salts thereof, a water-soluble stable zinc salt, and an essentially colourless non-coupling benzimidazole which in the form of its hydrochloride is at least 0.5%, by weight, soluble in water and which has a general formula selected from the class consisting of:

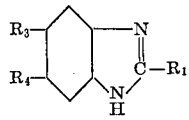

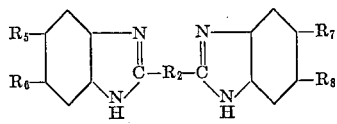

in which $R_1$ is selected from the class consisting of a hydrogen atom an alkyl, aralkyl, aminoalkyl, cyanoalkyl, alkyl carbonyl, alkoxy carbonyl and amido-carbonyl groups, $R_2$ represents a hydroxyalkylene radical, and $R_3$, $R_4$, $R_5$, $R_6$, $R_7$, and $R_8$ are each selected from the class consisting of hydrogen and halogen atoms and alkyl, alkoxy and nitro groups.

2. Two-component diazotype material according to claim 1, wherein the said benzimidazole is a compound of the general formula:

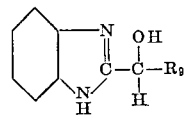

3. Two-component diazotype material according to claim 1, wherein the said benzimidazole is a compound of the general formula

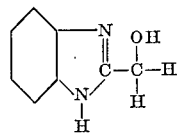

4. Two-component diazotype material according to claim 1, wherein said tertiary amino group of the diazonium compound is a dialkylamino group.

5. Two-component diazotype material according to claim 1, wherein said tertiary amino group of the diazonium compound is a morpholino group.

6. Two-component diazotype material according to claim 1, wherein the said benzimidazole is 2-methyl-5-chloro benzimidazole.

7. Two-component diazotype material according to claim 1, wherein the said benzimidazole is 6-nitro benzimidazole.

8. Two-component diazotype material according to claim 1, wherein the said benzimidazole is 2-(1',2'-dihydroxyethyl) benzimidazole.

9. Two-component diazotype material according to claim 1, wherein the said benzimidazole is 2-(1'-hydroxy-n-pentyl) benzimidazole.

References Cited by the Examiner

UNITED STATES PATENTS 2,548,845  4/1951  Newmann _____ 96—91
2,566,167  8/1951  Carroll et al. _____ 96—104
3,099,559  7/1963  Coles.

NORMAN G. TORCHIN, *Primary Examiner.*

R. I. STONE, B. BOWERS, *Assistant Examiners.*